(12) United States Patent
Chen et al.

(10) Patent No.: US 8,525,504 B2
(45) Date of Patent: Sep. 3, 2013

(54) SWITCHING POWER SUPPLY AND RELATED CONTROL METHOD

(75) Inventors: Ren-Yi Chen, Hsin-Chu (TW); Chun-Teh Chen, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 806 days.

(21) Appl. No.: 12/639,959

(22) Filed: Dec. 16, 2009

(65) Prior Publication Data

US 2011/0068768 A1 Mar. 24, 2011

(30) Foreign Application Priority Data

Sep. 18, 2009 (TW) ................................ 98131622 A (51) Int. Cl.
*G05F 1/40* (2006.01)
*H02M 3/335* (2006.01)

(52) U.S. Cl.
USPC ......... 323/285; 323/271; 363/21.01; 363/131

(58) Field of Classification Search
USPC ................ 363/20, 131, 21.01; 323/222, 282, 323/284, 285, 271
See application file for complete search history.

(56) References Cited

U.S. PATENT DOCUMENTS

| | | | | |
|---|---|---|---|---|
| 5,515,103 A | * | 5/1996 | Ito | 348/312 |
| 6,674,656 B1 | * | 1/2004 | Yang et al. | 363/21.1 |
| 7,919,952 B1 | * | 4/2011 | Fahrenbruch | 323/222 |
| 8,045,351 B2 | * | 10/2011 | Hsueh et al. | 363/95 |
| 8,207,721 B2 | | 6/2012 | Sohma | |
| 2003/0048645 A1 | * | 3/2003 | Hosotani et al. | 363/21.12 |
| 2010/0052742 A1 | * | 3/2010 | Chen et al. | 327/134 |
| 2010/0124080 A1 | * | 5/2010 | Yeh et al. | 363/21.12 |
| 2011/0305055 A1 | * | 12/2011 | Hsu et al. | 363/127 |

FOREIGN PATENT DOCUMENTS

| | | |
|---|---|---|
| JP | 200933883 A | 2/2009 |
| TW | 200719565 | 5/2007 |

\* cited by examiner

*Primary Examiner* — Jessica Han
(74) *Attorney, Agent, or Firm* — Winston Hsu; Scott Margo (57) ABSTRACT

A switching power supply includes a power switch, an adjusting circuit and a limit signal generator. The power switch operates according to a switch control signal. The adjusting circuit adjusts the turn-on time of the switch control signal according to a limit signal and a detecting signal which corresponds to the current passing the power switch. When the detecting signal exceeds or is equal to the limit signal, the limit signal generator samples a reference signal and updates the limit signal according to the sampled reference signal.

20 Claims, 7 Drawing Sheets

SWITCHING POWER SUPPLY AND RELATED CONTROL METHOD

BACKGROUND OF THE INVENTION

1. Field of the Invention

The present invention is related to a switching power supply, and more particularly, to a switching power supply which updates the limit signal of the present period according to the sampled value of the reference signal during the previous period.

2. Description of the Prior Art

A well-designed power converting circuit aims at providing a stable output voltage and a wide range of output current. Therefore, when a sudden variation in the load occurs, efficient conversion can still be achieved by keeping the output voltage at its original voltage level and swiftly providing various load currents accordingly. Common power converting circuits include switching regulators and linear regulators.

Figure 1:
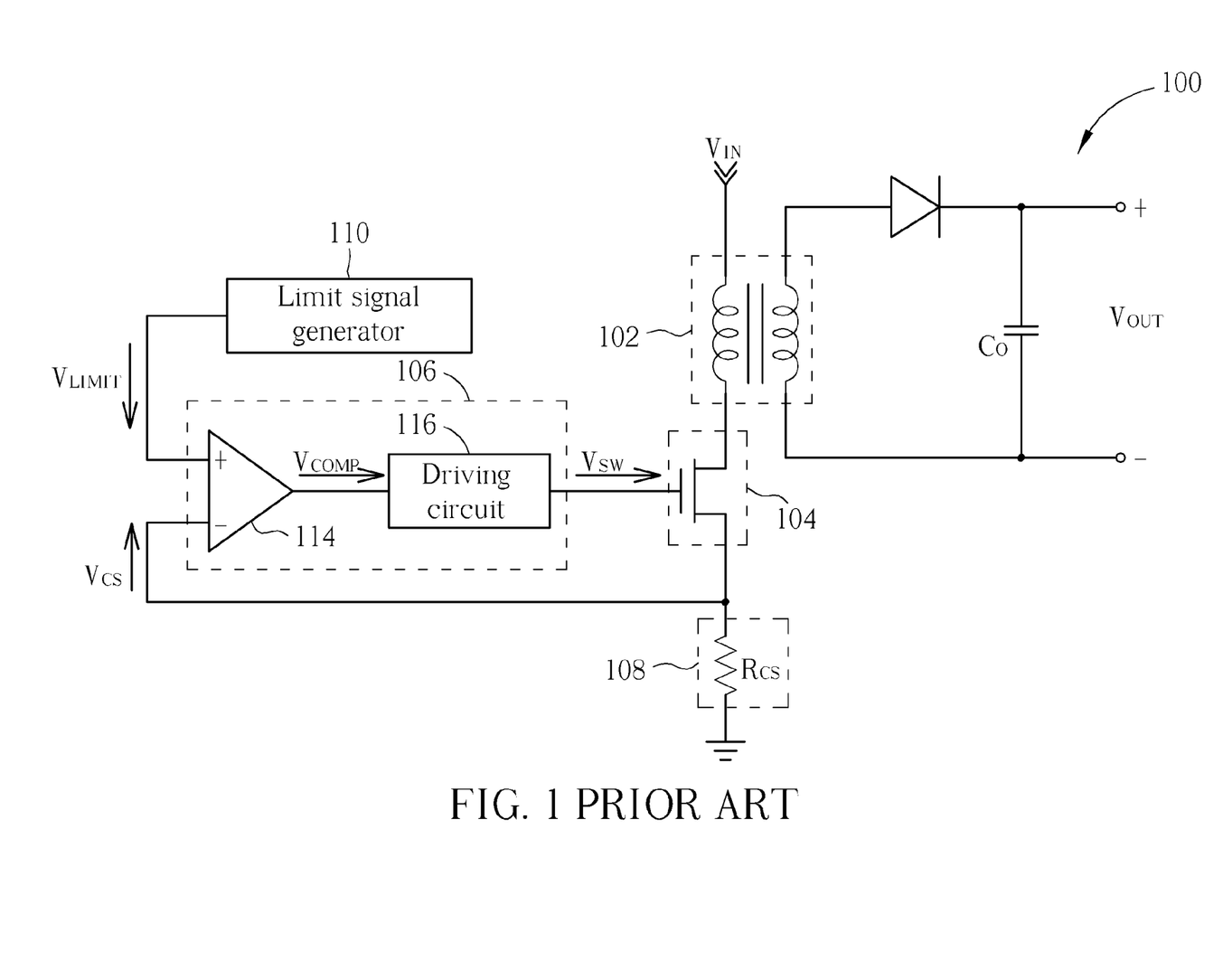
FIG. 1 is a diagram illustrating a prior art switching power supply.

Reference is made to FIG. 1 for a diagram illustrating a prior art switching power supply 100. Switching power supply 100, including a transformer 102, a power switch 104, an adjusting circuit 106, a detecting circuit 108, and a limit signal generator 110, can converts input voltage $V_{IN}$ into output voltage $V_{OUT}$. Power switch 104 operates according to a switch control signal $V_{SW}$: when power switch 104 is turned on, the current passing the primary coil of transformer 102 increases since transformer 102 is charged by input voltage $V_{IN}$; when power switch 104 is turned off, the energy stored in the primary coil of transformer 102 is released by charging output capacitor $C_o$ through the secondary coil of transformer 102. Detecting circuit 108, including a resistor $R_{CS}$ coupled in series with power switch 104, can monitor the current passing power switch 104, thereby providing a corresponding detecting signal $V_{CS}$. Limit signal generator 110 can provide a limit signal $V_{LIMIT}$ for approximately defining the maximum current $I_{P-MAX}$ which is allowed to pass the primary coil of transformer 102. Adjusting circuit 106 includes a comparator 114 and a driving circuit 116. When detecting signal $V_{CS}$ exceeds limit signal $V_{LIMIT}$, driving circuit 116 generates switch control signal $V_{SW}$ according to a compare signal $V_{COMP}$ so as to turn off power switch 104. At the moment when power switch 104 is turned off, the current passing power switch 104 is equal to $I_{P-MAX}$.

Since the maximum output power of switching power supply 100 is determined by the maximum current $I_{P-MAX}$, the value of $I_{P-MAX}$ should remain constant regardless of input voltage $V_{IN}$. However, signal propagation delay inevitably exists from that detecting signal $V_{CS}$ exceeds limit signal $V_{LIMIT}$ to that power switch 104 is actually turned off. Therefore, if limit signal $V_{LIMIT}$ is fixed, the maximum current $I_{P-MAX}$ will increase with input voltage $V_{IN}$. One common solution is to make limit signal $V_{LIMIT}$ increase with the turn-on time of power switch 104. In other words, a higher input voltage $V_{IN}$, resulting in a shorter turn-on time of power switch 104, corresponds to a smaller value of limit signal $V_{LIMIT}$. With proper design, signal propagation delay can be compensated and a stable maximum current $I_{P-MAX}$ can thus be provided.

Another common problem found in switching power supplies is sub-harmonic oscillation. Sub-harmonic oscillation occurs when the duty cycle is over 50% and the switching power supply may oscillate with half the frequency with which the power switch is turned on/off. Slope compensation is a solution to solving sub-harmonic oscillation. One simple approach is to make limit signal $V_{LIMIT}$ decrease with the turn-on time of power switch 104. In other words, a larger duty cycle, resulting in a longer turn-on time of power switch 104, corresponds to a smaller value of limit signal $V_{LIMIT}$.

As mentioned above, the approach aimed at improving sub-harmonic oscillation worsens the variation in the maximum current $I_{P-MAX}$ caused by signal propagation delay, and vice versa.

SUMMARY OF THE INVENTION

The present invention provides a switching power supply comprising a power switch which operates according to a switch control signal having an adjustable turn-on time; an adjusting circuit for providing the switch control signal and adjusting the turn-on time of the switch control signal according to a limit signal and a detecting signal which corresponding to a current passing the power switch; and a limit signal generator for sampling a reference signal and updating the limit signal according to the sampled reference signal when the detecting signal exceeds or equal to the limit signal.

The present invention further provides an integrated circuit which generates a switch control signal with an adjustable turn-on time for driving a power switch comprising an adjusting circuit for providing the switch control signal and adjusting the turn-on time of the switch control signal according to a limit signal and a detecting signal which corresponds to a current passing the power switch; and a limit signal generator for sampling a reference signal and updating the limit signal according to the sampled reference signal when the detecting signal exceeds or equal to the limit signal.

The present invention further provides a method for controlling a switching power supply comprising turning on or turning off a power switch according to a switch control signal; providing a detecting signal according to a current passing the power switch; adjusting a turn-on time of the switch control signal according to the detecting signal and a limit signal; sampling a reference signal when the detecting signal exceeds or is equal to the limit signal; and updating the limit signal according to the sampled reference signal.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
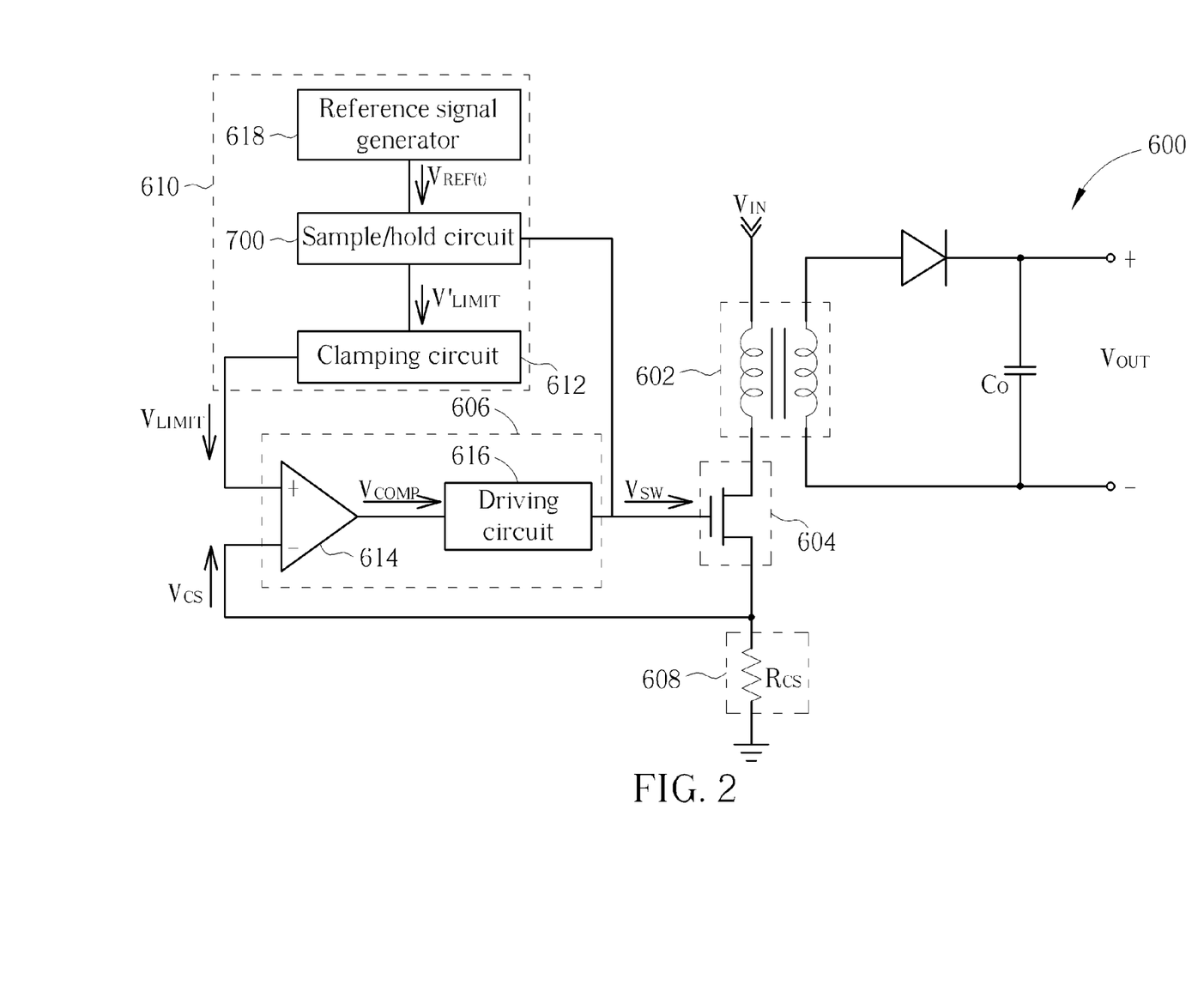
FIG. 2 is a diagram illustrating a switching power supply according to the present invention.

Reference is made to FIG. 2 for a diagram illustrating a switching power supply 600 according to the embodiment of the present invention. Switching power supply 600, including a transformer 602, a power switch 604, an adjusting circuit 606, a detecting circuit 608, and a limit signal generator 610, can convert input voltage $V_{IN}$ into output voltage $V_{OUT}$. Power switch 604 operates according to a switch control signal $V_{SW}$: when power switch 604 is turned on, the current passing the primary coil of transformer 602 increases since transformer 602 is charged by input voltage $V_{IN}$; when power switch 604 is turned off, the energy stored in the primary coil of transformer 602 is released by charging output capacitor $C_o$ through the secondary coil of transformer 602. Detecting circuit 608, including a resistor $R_{CS}$ coupled in series with power switch 604, can monitor the current passing power switch 604, thereby providing a corresponding detecting signal $V_{CS}$. Limit signal generator 610, including a reference signal generator 618, a sample/hold circuit 700 and a clamping circuit 612, can provide a limit signal $V_{LIMIT}$. Reference signal generator 618 provides a reference signal $V_{REF}(t)$ which varies with time t. Sample/hold circuit 700 samples reference signal $V_{REF}(t)$ according to the voltage level of switch control signal $V_{SW}$ and outputs the sampled reference signal as the new limit signal $V'_{LIMIT}$ for the next period. Clamping circuit 612 can maintain the maximum value of limit signal $V'_{LIMIT}$ at a predetermined value to avoid system overload. Therefore, if limit signal $V'_{LIMIT}$ does not exceed the predetermined value, limit signal $V_{LIMIT}$ outputted by clamping circuit 612 is equal to the limit signal $V'_{LIMIT}$ outputted by sample/hold circuit 700; if limit signal $V'_{LIMIT}$ exceeds the predetermined value, limit signal $V_{LIMIT}$ is kept at the predetermined value. Adjusting circuit 606 includes a comparator 614 and a driving circuit 616: comparator 614 includes a positive input end for receiving limit signal $V_{LIMIT}$, a negative input end for receiving detecting signal $V_{CS}$, and an output end for outputting a corresponding compare signal $V_{COMP}$ according to the relationship between limit signal $V_{LIMIT}$ and detecting signal $V_{CS}$; driving circuit 616 can generate the duty cycle of switch control signal $V_{SW}$ according to compare signal $V_{COMP}$, thereby controlling power switch 604.

Figure 3:
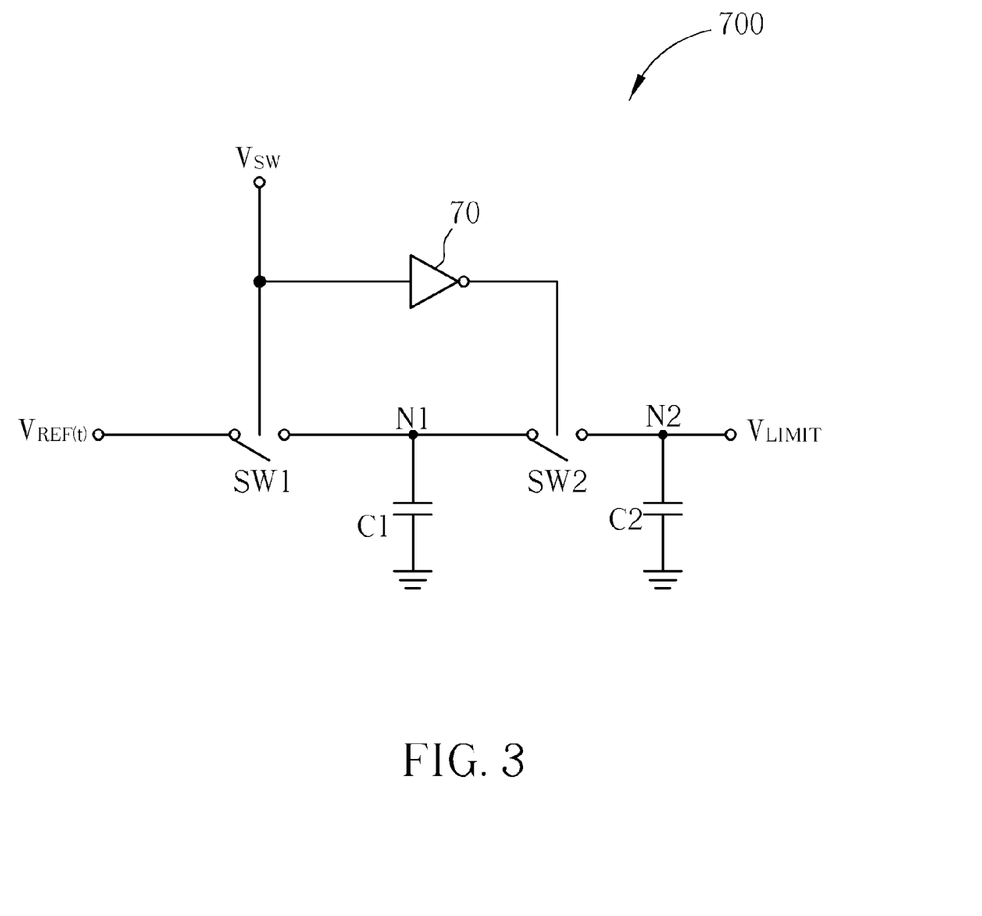
FIG. 3 is a diagram illustrating a sample/hold circuit according to the first embodiment of the present invention.

Reference is made to FIG. 3 for a diagram illustrating sample/hold circuit 700 according to the first embodiment of the present invention. Sample/hold circuit 700 includes two switches SW1 and SW2, two capacitors C1 and C2, and an inverter 70. With inverter 70, switches SW1 and SW2 can operate in a complimentary manner according to the voltage level of switch control signal $V_{SW}$: when switch control signal $V_{SW}$ is at high level, switch SW1 is turned on (short circuit) and switch SW2 is turned off (open circuit); when switch control signal $V_{SW}$ is at low level, switch SW1 is turned off and switch SW2 is turned on.

In the present embodiment, limit signal $V_{LIMIT}$ corresponding to each period has a specific value. For example, the values of limit signal $V_{LIMIT}$ corresponding to the periods T1-Tn are respectively represented by V1-Vn, while the time points when the detecting signal $V_{CS}$ reaches limit signal V1-Vn during periods T1-Tn are represented by t1-tn. Two continuous periods T1 and T2 are used for illustration. After entering period T1, switch control signal $V_{SW}$ maintains at high voltage level when detecting signal $V_{CS}$ does not exceed limit signal $V_{LIMIT}$. Since switch SW1 is turned on and switch SW2 is turned off during this period, reference signal $V_{REF}(t)$ charges capacitor C1 so that the voltage level of reference signal $V_{REF}(t)$ is retained at memory terminal N1 of capacitor C1. After detecting signal $V_{CS}$ exceeds or is equal to limit signal $V_{LIMIT}$ at the time point t1, switch control signal $V_{SW}$ switches to low voltage level. Since switch SW1 is turned off and switch SW2 is turned on during this period, the charges stored in capacitor C1 is transmitted to capacitor C2. Based on charge distribution, the voltage level at memory terminal N2 of capacitor C2 can thus be updated to be the basis for determining the next limit signal V2 of the next period T2.

In other words, for a specific period, when the detecting signal $V_{CS}$ reaches the limit signal $V_{LIMIT}$ of this specific period at a specific time, the present embodiment samples the reference signal $V_{REF}(t)$ at this specific time and update the limit signal $V_{LIMIT}$ of this specific period according to the sampled reference signal $V_{REF}(t)$. The updated limit signal $V_{LIMIT}$ can further be outputted by the clamping circuit as the limit signal $V_{LIMIT}$ of the next period.

Figure 4:
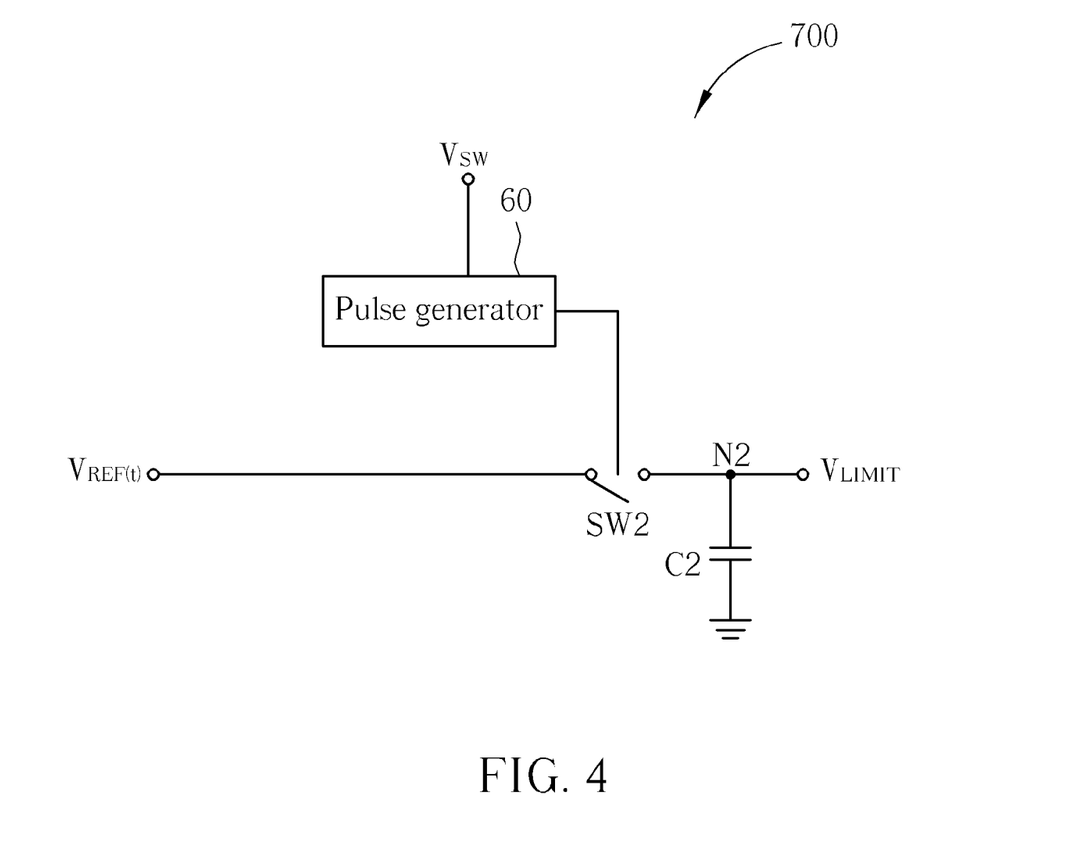
FIG. 4 is a diagram illustrating a sample/hold circuit according to the second embodiment of the present invention.

Reference is made to FIG. 4 for a diagram illustrating sample/hold circuit 700 according to the second embodiment of the present invention. In the embodiment depicted in FIG. 4, sample/hold circuit 700 includes a switch SW2 and a pulse generator 60. Switch SW2 operates according to the pulse signal outputted by the pulse generator 60. In this embodiment, the voltage level of reference signal $V_{REF}(t)$ is retained at memory terminal N2 of capacitor C2. When switch SW2 is turned on, the voltage level at memory terminal N2 of capacitor C2 can thus be updated to be the basis for determining the limit signal of the next period.

Figure 5:
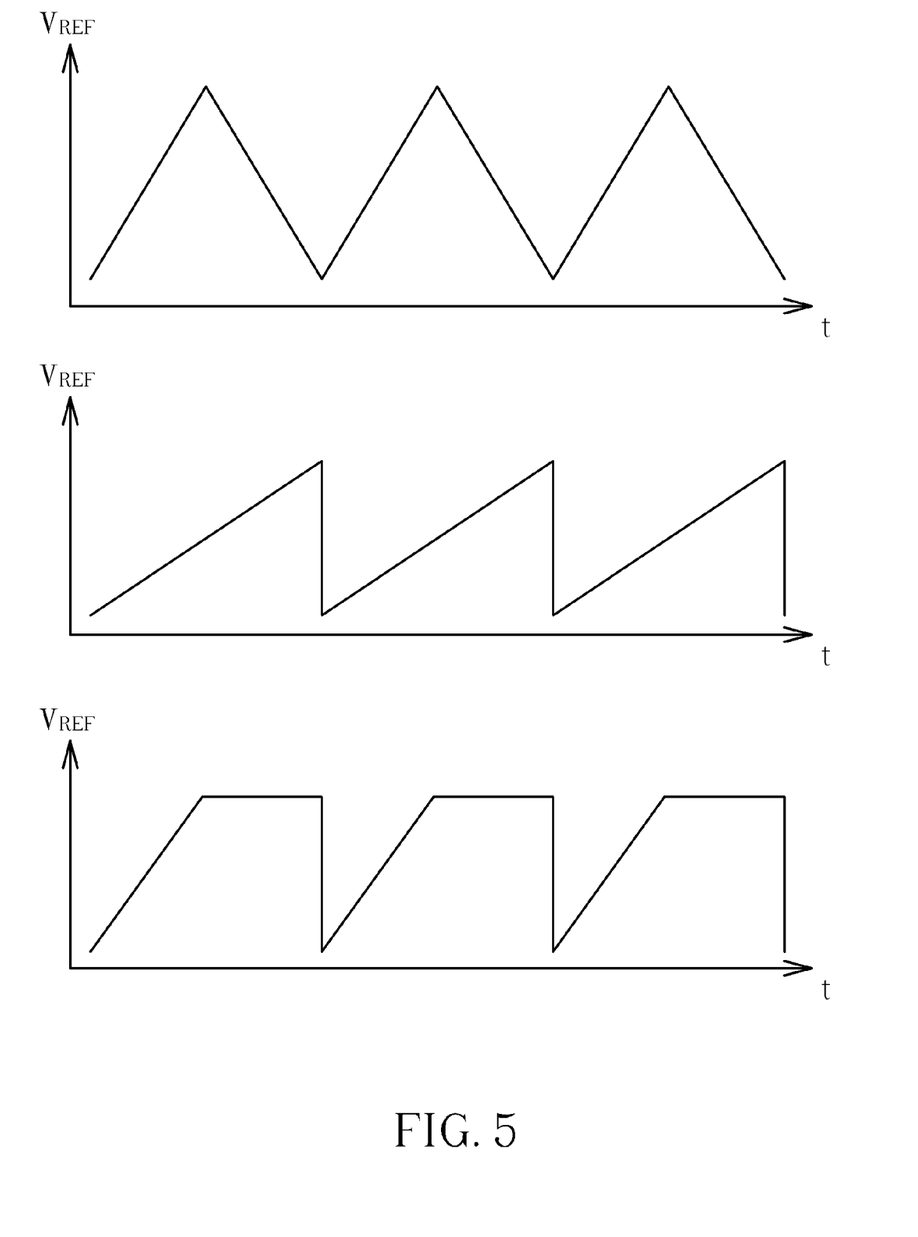
FIG. 5 is a diagram illustrating the waveforms of the reference signal according to the embodiment of the present invention.

Reference is made to FIG. 5 for a diagram illustrating the waveforms of the reference signal $V_{REF}(t)$ according to the embodiment of the present invention. Reference signal $V_{REF}(t)$ is a periodically time-varying signal which includes at least one rising section during the turn-on time of switch control signal $V_{SW}$. The triangular and ramp signals depicted in FIG. 5 are merely for illustrative purpose and do not limit the scope of the present invention. Also, reference signal generator 618 can also be a built-in oscillator of driving circuit 616.

Figure 6:
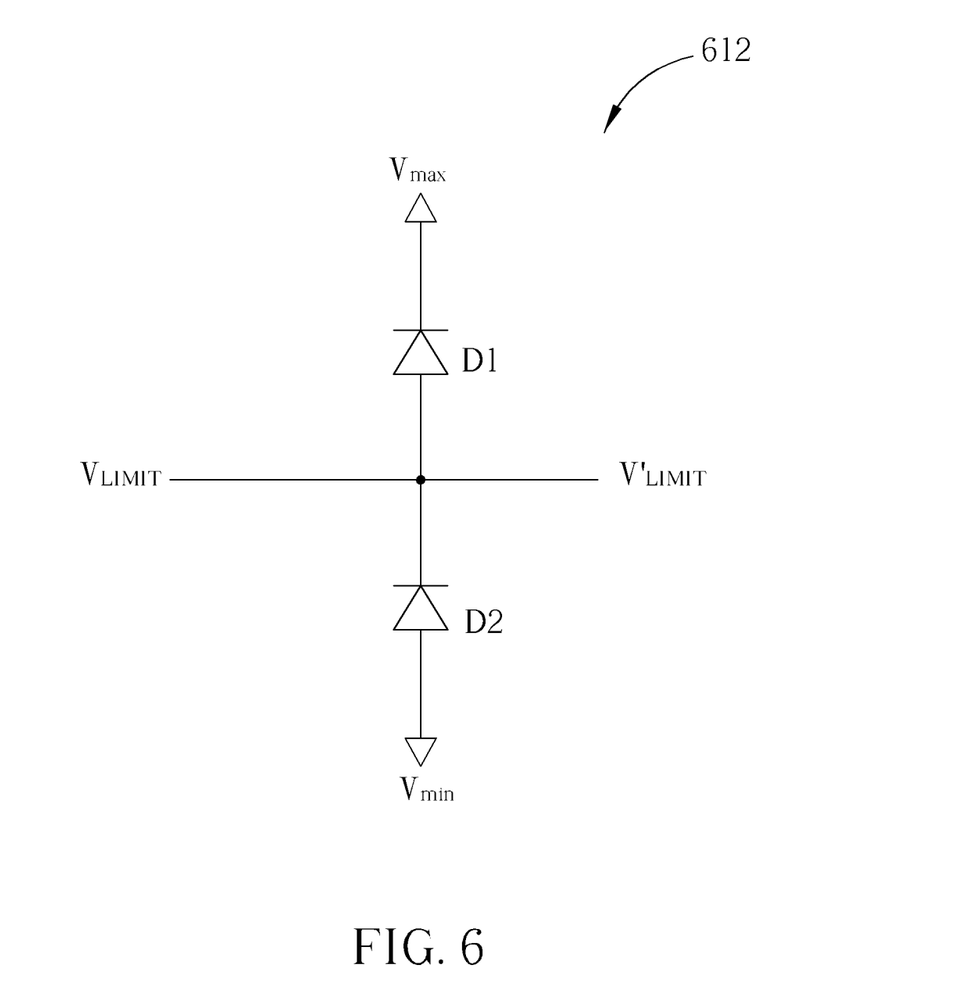
FIG. 6 is a diagram illustrating a clamping circuit according to the embodiment of the present invention.

Reference is made to FIG. 6 for a diagram illustrating clamping circuit 612 according to the embodiment of the present invention. Clamping circuit 612 includes two diodes D1 and D2. The diodes D1 and D2 are coupled in series between bias voltages $V_{max}$ and $V_{min}$. Clamping circuit 612 can maintain the value of the limit signal within a predetermined range to avoid system overload. Clamping circuit 612 depicted in FIG. 6 is merely for illustrative purpose and does not limit the scope of the present invention.

Figure 7:
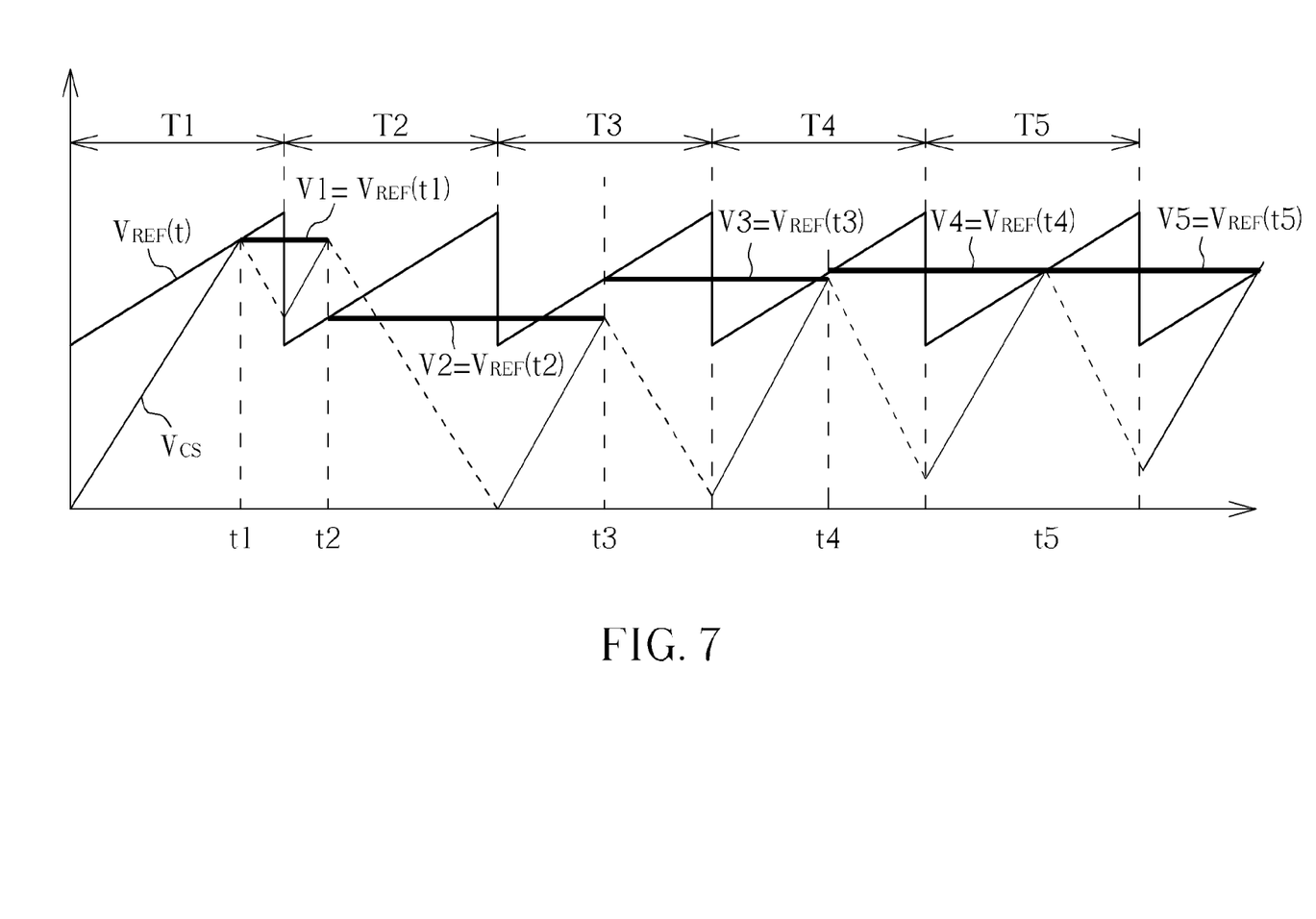
FIG. 7 is a timing diagram illustrating the operation of the switching power supply according to the embodiment of the present invention.

According to the embodiments of the present invention, limit signals $V_{LIMIT}$ with different values are provided during different periods, and the limit signal $V_{LIMIT}$ of present period is determined and updated by switch control signal $V_{SW}$ of a previous period. In other words, when the detecting signal $V_{CS}$ reaches limit signal $V_{LIMIT}$ of each period, the present embodiment samples the reference signal $V_{REF}(t)$ and updates the limit signal $V_{LIMIT}$ of the next period according to the sampled reference signal $V_{REF}(t)$, as illustrated in FIG. 7. FIG. 7 illustrates a timing diagram when driving the switching power supply according to the present invention.

For example, the values of limit signal $V_{LIMIT}$ corresponding to the periods T1-T5 are respectively represented by V1-V5, while the time points when the detecting signal $V_{LIMIT}$ reaches limit signal V1-V5 during the periods T1-T5 are represented by t1-t5. In this embodiment, the reference signal $V_{REF}(t)$ is a ramp signal whose sampled value increases with the turn-on time of power switch 604. In other words, a higher input voltage $V_{IN}$ resulting in a shorter turn-on time of power switch 604 corresponds to a smaller value of limit signal $V_{LIMIT}$. As a result, signal propagation delay can be compensated and a stable maximum current $I_{P-MAX}$ can thus be provided.

After entering period T1, power switch 604 is turned on. When the detecting signal $V_{CS}$ reaches reference signal $V_{REF}$ (t1) at t1, power switch 604 is turned off. Limit signal generator 610 then samples reference signal $V_{REF}(t)$, thereby setting the value V1 of limit signal $V_{LIMIT}$ to $V_{REF}(t1)$. Meanwhile, the primary coil stops to charge, while the secondary coil starts to discharge, as indicated by the dot line in FIG. 7. After entering period T2, power switch 604 is again turned on. Since period T1 has a short discharge time, some energy is still stored in the primary coil. Detecting signal $V_{CS}$ does not rise from zero after power switch 604 is again turned on, as shown in FIG. 7. When detecting signal $V_{CS}$ reaches the updated limit signal V1 at t2, power switch 604 is turned off. Limit signal generator 610 then samples reference signal $V_{REF}(t)$, thereby determining value V2 of limit signal $V_{LIMIT}$ to be $V_{REF}(t2)$, and so on and so forth. The present invention can regulate limit signal $V_{LIMIT}$ during each period so that limit signal $V_{LIMIT}$ gradually converges into a constant value (for example, V4=V5). With this approach, limit signal $V_{LIMIT}$ can remain in a stable state by swiftly updating its value in response to change in input voltage $V_{IN}$.

On the other hand, the present invention can also improve sub-harmonic oscillation effectively. As shown in FIG. 7, when the duty cycle is over 50%, limit signal $V_{LIMIT}$ sampled at t2 is much smaller than that sampled at t1. Therefore, the duty cycle can be reduced to a reasonable range during the next period T3 to prevent sub-harmonic oscillation and provide stable output.

Those skilled in the art will readily observe that numerous modifications and alterations of the device and method may be made while retaining the teachings of the invention.

What is claimed is:

1. A switching power supply comprising:
    a power switch which operates according to a switch control signal having an adjustable turn-on time;
    an adjusting circuit for providing the switch control signal and adjusting the turn-on time of the switch control signal according to a limit signal and a detecting signal corresponding to a current passing the power switch; and
    a limit signal generator configured for sampling a reference signal and updating the limit signal according to the sampled reference signal when the detecting signal exceeds or is equal to the limit signal.

2. The switching power supply of claim 1, wherein the limit signal generator further comprises:
    a sample/hold circuit for providing the limit signal; and
    a reference signal generator for providing the reference signal to the sample/hold circuit.

3. The switching power supply of claim 2, wherein the sample/hold circuit comprises:
    a first switch which operates according to the switch control signal; and
    a first capacitor having a first memory terminal for retaining the reference signal via the first switch.

4. The switching power supply of claim 3, wherein the sample/hold circuit further comprises:
    a second switch which operates according to the switch control signal, wherein the first and second switches operate in a complimentary manner; and
    a second capacitor having a second memory terminal for retaining the reference signal via the second switch.

5. The switching power supply of claim 1, wherein the reference signal includes at least a rising section during the turn-on time of the switch control signal.

6. The switching power supply of claim 1, further comprising:
    a detecting circuit for generating the detecting signal by monitoring the current passing the power switch.

7. The switching power supply of claim 1, wherein the adjusting circuit comprises:
    a comparator for generating a corresponding compare signal by comparing the limit signal with the detecting signal; and
    a driving circuit for adjusting a duty cycle of the switch control signal according to the compare signal.

8. An integrated circuit which generates a switch control signal with an adjustable turn-on time for driving a power switch comprising:
    an adjusting circuit for providing the switch control signal and adjusting the turn-on time of the switch control signal according to a limit signal and a detecting signal which corresponds to a current passing the power switch; and
    a limit signal generator configured for sampling a reference signal and updating the limit signal according to the sampled reference signal when the detecting signal exceeds or is equal to the limit signal.

9. The integrated circuit of claim 8, wherein the limit signal generator further comprises:
    a sample/hold circuit for providing the limit signal; and
    a reference signal generator for providing the reference signal to the sample/hold circuit.

10. The integrated circuit of claim 9, wherein the sample/hold circuit comprises:
    a first switch which operates according to the switch control signal; and
    a first capacitor having a first memory terminal for retaining the reference signal via the first switch.

11. The integrated circuit of claim 10, wherein the sample/hold circuit further comprises:
    a second switch which operates according to the switch control signal, wherein the first and second switches operate in a complimentary manner; and
    a second capacitor having a second memory terminal for retaining the reference signal via the second switch.

12. The integrated circuit of claim 8, wherein the limit signal generator further comprises:
    a clamping circuit for limiting the limit signal within a predetermined range.

13. The integrated circuit of claim 8 wherein the reference signal includes at least a rising section during the turn-on time of the switch control signal.

14. The integrated circuit of claim 13 wherein the reference signal is a ramp signal.

15. The integrated circuit of claim 8 further comprising:
    a detecting circuit for generating the detecting signal by monitoring the current passing the power switch.

16. The integrated circuit of claim 8 wherein the adjusting circuit comprises:
    a comparator for generating a corresponding compare signal by comparing the limit signal with the detecting signal; and
    a driving circuit for adjusting a duty cycle of the switch control signal according to the compare signal.

17. A method for controlling a switching power supply comprising:
    turning on or turning off a power switch according to a switch control signal;
    providing a detecting signal according to a current passing the power switch;
    adjusting a turn-on time of the switch control signal according to the detecting signal and a limit signal;
    sampling a reference signal when the detecting signal exceeds or is equal to the limit signal; and updating the limit signal according to the sampled reference signal.

18. The method of claim 17 further comprising:

limiting the limit signal within a predetermined range.

19. The method of claim 17 further comprising:

providing the reference signal which includes at least a rising section during the turn-on time of the switch control signal.

20. The method of claim 17 further comprising:

providing a ramp signal as the reference signal.

* * * * *